United States Patent
Lin

(10) Patent No.: US 12,395,315 B2
(45) Date of Patent: Aug. 19, 2025

(54) ENCRYPTED SIGNAL SEGMENT LOCATING DEVICE AND METHOD

(71) Applicant: INSTITUTE FOR INFORMATION INDUSTRY, Taipei (TW)

(72) Inventor: Ting-Yu Lin, Taipei (TW)

(73) Assignee: INSTITUTE FOR INFORMATION INDUSTRY, Taipei (TW)

( * ) Notice: Subject to any disclaimer, the term of this patent is extended or adjusted under 35 U.S.C. 154(b) by 178 days.

(21) Appl. No.: 18/507,087

(22) Filed: Nov. 12, 2023

(65) Prior Publication Data

US 2025/0119271 A1  Apr. 10, 2025

(30) Foreign Application Priority Data

Oct. 5, 2023 (TW) .................. 112138355

(51) Int. Cl.
*H04L 9/00* (2022.01)
*H04L 9/12* (2006.01)
*H04L 9/40* (2022.01)

(52) U.S. Cl.
CPC .................. *H04L 9/002* (2013.01)

(58) Field of Classification Search
CPC . H04L 9/002; H04L 9/003; H04L 9/12; H04L 63/302
See application file for complete search history.

(56) References Cited

U.S. PATENT DOCUMENTS

| 10,015,006 B2 * | 7/2018 | Prvulovic | H04L 9/003 |
| 10,776,484 B2 * | 9/2020 | Nagata | H04L 9/10 |
| 2004/0049700 A1 * | 3/2004 | Yoshida | H04L 63/04 714/E11.125 |
| 2010/0246808 A1 * | 9/2010 | Hisakado | H04L 9/0618 380/1 |
| 2021/0014205 A1 * | 1/2021 | Montoya | H04L 63/1408 |

FOREIGN PATENT DOCUMENTS

KR    20140127119 A    11/2014

OTHER PUBLICATIONS

Anonymous; "Cross-correlation—Wikipedia;" XP093154555 Retrieved from the Internet:URL:https://en.wikipedia.org/w/index.php?title=cross-correlation&oldid=1170377241; Aug. 14, 2023; p. 1-10.
The extended European search report of the corresponding European application No. EP23213753.9 issued on May 13, 2024.

* cited by examiner

*Primary Examiner* — Darren B Schwartz
(74) *Attorney, Agent, or Firm* — CKC & Partners Co., LLC

(57) ABSTRACT

Encrypted signal segment locating device and method. The device is configured to execute the following operations. An encrypted signal template is transformed into a signal template formed by template data points. The signal template is adjusted based on a frequency difference and a clock rate difference between a side-channel input signal and the signal template to generate an adjusted template. The adjusted template and the side-channel input signal are compared by using a sliding window to generate compared segments in the side-channel input signal and similarities corresponding to the compared segments. When the similarities are higher than a threshold, one of the compared segments is selected as an encrypted signal segment, and an encryption position is located by using the sliding window, wherein the encrypted signal segment is the compared segment having a highest similarity.

20 Claims, 9 Drawing Sheets

ENCRYPTED SIGNAL SEGMENT LOCATING DEVICE AND METHOD

CROSS-REFERENCE TO RELATED APPLICATION

This application claims priority to Taiwan Application Serial Number 112138355, filed Oct. 5, 2023, which is herein incorporated by reference in its entirety.

BACKGROUND

Field of Invention

The present disclosure relates to an encrypted signal segment locating device and method. More particularly, the present disclosure relates to an encrypted signal segment locating device and method for side-channel attack information.

Description of Related Art

With the improvement of information security awareness, more and more hardware circuits are designed with the ability to perform encrypting operations. However, when these hardware circuits perform encryption calculations by using existing encryption algorithms, it is difficult to crack the encryption protection combined with the software and hardware directly.

Under this trend, side-channel attack (SCA) has become a well-known attack method that has attracted international attention in recent years against post-silicon chips. Side-channel attacks collect inadvertently leaked physical signals from hardware devices performing cryptographic operations, and obtain secret information such as the encryption and decryption keys or the plaintext before encryption by using statistical, signal processing and other analysis techniques. The physical signals inadvertently leaked during cryptographic operations, such as: electromagnetic wave intensity, current, power consumption, operation sounds, light emitted by the signal lights of the calculation equipment, etc., can be captured through different types of side-channel acquisition equipment, and the signals captured by the side-channel acquisition equipment are called side-channel information (trace).

Currently, the technology of the acquisition equipment is mature, so the trace collecting operation is relatively easy. The technical difficulty lies in the analysis of side-channel information. For example, the prior art of deciphering the encryption key from the side-channel information is mainly to analyze the side-channel information through statistical analysis. However, the calculation process requires a lot of time. Since the side-channel information may be mixed with noise or signals generated by other computing operations, experienced professionals are required to assist in manually identifying the side-channel information and then recognizing the encrypted signal segment corresponding to the encrypting operation from the side-channel information.

In view of this, how to locate the encrypted signal segment of a specific computing operation in the side-channel information is the goal that the industry strives to work on.

SUMMARY

The disclosure provides an encrypted signal segment locating device comprising a side-channel sensor, a storage, and a processor. The side-channel sensor is configured to detect a side-channel input signal. The storage is configured to store an encrypted signal template and the side-channel input signal. The processor is electrically connected to the side-channel sensor and the storage. The processor is configured to transform the encrypted signal template into a signal template formed by a plurality of template data points. The processor is further configured to adjust the signal template based on a frequency difference between a sampling frequency corresponding to the side-channel input signal and the sampling frequency corresponding to the signal template and a clock rate difference between a computing clock rate corresponding to the side-channel input signal and the computing clock rate corresponding to the signal template to generate an adjusted template. The processor is further configured to compare the adjusted template with the side-channel input signal by using a sliding window to generate a plurality of compared segments in the side-channel input signal and a plurality of first similarities corresponding to the compared segments. When the first similarities are higher than a threshold, the processor is further configured to select one of the compared segments as an encrypted signal segment, and locating an encryption position by using the sliding window, wherein the encrypted signal segment is one of the compared segments having a highest first similarity.

The disclosure further provides an encrypted signal segment locating method being adapted for use in an electronic device, wherein the electronic device comprises a side-channel sensor, a storage, and a processor. The side-channel sensor is configured to detect a side-channel input signal. The storage is configured to store an encrypted signal template and the side-channel input signal. The processor is electrically connected to the side-channel sensor and the storage and configured to execute the encrypted signal segment locating method. The encrypted signal segment locating method comprises the following steps. The encrypted signal template is transformed into a signal template formed by a plurality of template data points. The signal template is adjusting based on a frequency difference between a sampling frequency corresponding to the side-channel input signal and the sampling frequency corresponding to the signal template and a clock rate difference between a computing clock rate corresponding to the side-channel input signal and the computing clock rate corresponding to the signal template to generate an adjusted template. The adjusted template and the side-channel input signal are compared by using a sliding window to generate a plurality of compared segments in the side-channel input signal and a plurality of first similarities corresponding to the compared segments. When the first similarities are higher than a threshold, one of the compared segments is selected as an encrypted signal segment, and an encryption position is located by using the sliding window, wherein the encrypted signal segment is one of the compared segments having a highest first similarity.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1:
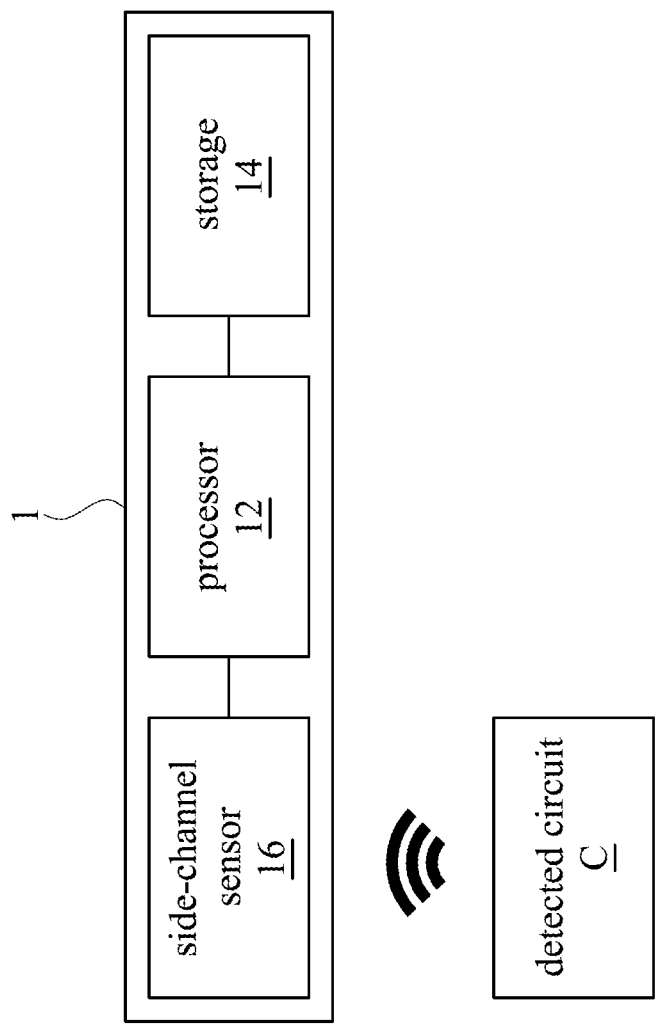
FIG. 1 is a schematic diagram illustrating an encrypted signal segment locating device of the present disclosure.

Reference will now be made in detail to the present embodiments of the disclosure, examples of which are illustrated in the accompanying drawings. Wherever possible, the same reference numbers are used in the drawings and the description to refer to the same or like parts.

Reference is made to FIG. 1. FIG. 1 is a schematic diagram illustrating an encrypted signal segment locating device 1 of the present disclosure. The encrypted signal segment locating 1 comprises a processor 12, a storage 14, and a side-channel sensor 16.

In some embodiments, the processor 12 can comprise a central processing unit (CPU), a graphics processing unit (GPU), a multi-processor, a distributed processing system, an application specific integrated circuit (ASIC), and/or a suitable processing unit.

In some embodiments, the storage 14 can comprise a semiconductor or solid-state memory, a magnetic tape, a removable computer diskette, a random-access memory (RAM), a read-only memory (ROM), a rigid magnetic disk, and/or an optical disk.

The side-channel sensor 16 is configured to detect a side-channel input signal from a detected circuit C, wherein the detected circuit C is a circuit performing a specific operation, such as a circuit performing an encrypting operation. In some embodiments, the side-channel sensor 16 can comprise an oscilloscope and a sensor, and the sensor electrically connects to the oscilloscope. The sensor of the side-channel sensor 16 is configured to detect a side-channel signal (trace) generated by the detected circuit C during performing encrypting operations, wherein the sensor collects the side-channel signal from the detected circuit C and transmits to the oscilloscope. The oscilloscope can display the waveform of the side-channel signal, allowing the user to track the waveform changes of the side-channel signal by operating the oscilloscope.

In some embodiments, the sensor is a voltage conductor, and the voltage conductor is electrically connected to a side-channel signal generating spot of the detected circuit C to collect a voltage signal generated by the detected circuit C during performing encrypting operations and take the voltage signals as the side-channel signal. For example, the side-channel signal generating spot can be the communication port or other nodes where the side-channel signal can be collected from of the detected circuit C. In other embodiments, the sensor is a current conductor, and the current conductor is configured to collect a current signal generated by the detected circuit C during performing encrypting operations. In other embodiments, the sensor is an infrared temperature sensor, and the infrared temperature sensor is configured to collect a temperature signal generated by the detected circuit C during performing encrypting operations at close range. In other embodiments, the sensor is an electromagnetic wave sensor, and the electromagnetic wave sensor is configured to collect an electromagnetic wave signal diffused by the detected circuit C during performing encrypting operations at close range. In other words, the side-channel signal can be a voltage signal, a current signal, a temperature signal, or an electromagnetic wave signal, etc., and there is no particular limitation in the present disclosure.

After the side-channel sensor 16 detects the side-channel signal from the detected circuit C and transmit the side-channel signal to the processor 12, the processor 12 stores the side-channel signal to the storage 14 as the side-channel input signal, and the storage 14 is configured to store the side-channel input signal.

Additionally, the storage 14 is configured to store an encrypted signal template, and the encrypted signal template is an encrypted signal segment after feature extraction and corresponding to a specific encrypting calculation process. For example, the encrypted signal template can be an encrypted signal template after performing filtering, encrypted signal segment locating, feature extraction, and other process on a side-channel signal generated by an encryption chip during performing an encryption algorithm, and the encrypted signal template corresponds to a specific encryption algorithm (e.g., Data Encryption Standard (DES) algorithm or Advanced Encryption Standard (AES) algorithm).

The encrypted signal template comprises side-channel signal features of the specific encrypting operation. In other words, when a computing unit executes the specific encrypting operation, the side-channel signal generated by the computing unit may contain identical or similar waveform features. Therefore, the encrypted signal template can be used for comparing with the side-channel input signal to check if the side-channel input signal contains waveform features identical or similar with the waveform features in the encrypted signal template, thereby determining whether the side-channel signal corresponds to the specific encrypting operation.

Figure 2:
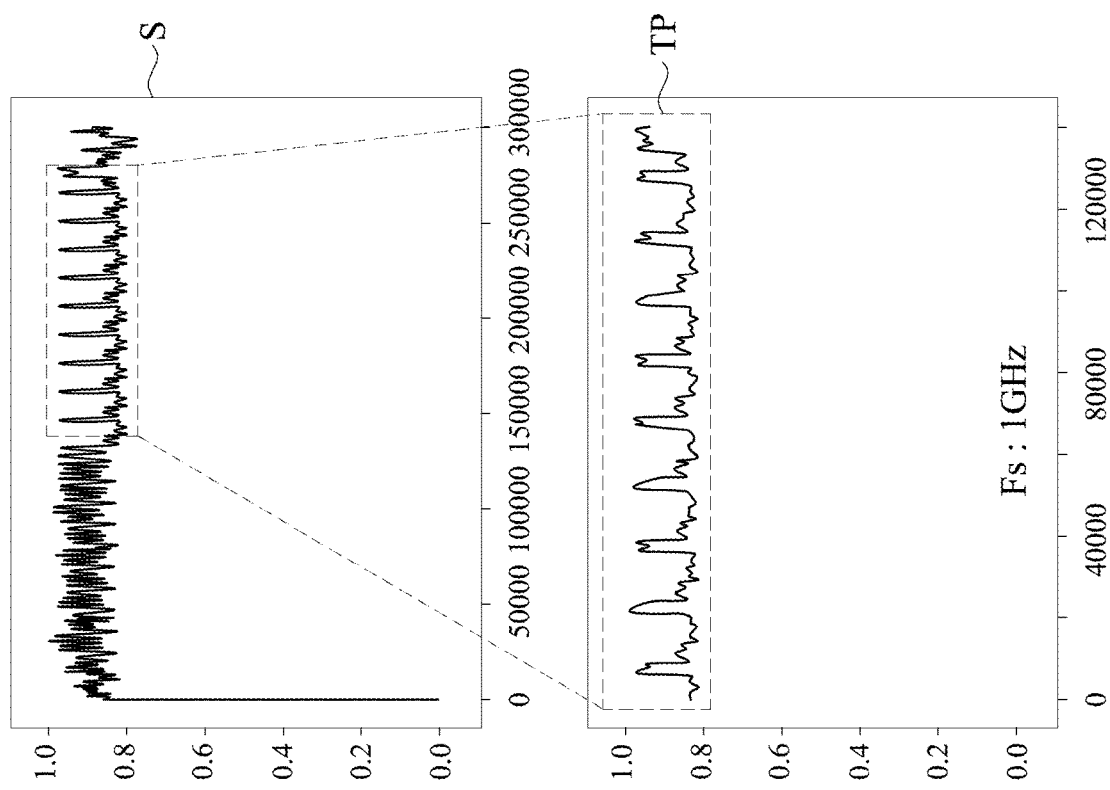
FIG. 2 is a schematic diagram illustrating extracting an encrypted signal segment from a side-channel input signal of the present disclosure.

Reference is made to FIG. 2. In some embodiments, an encrypted signal template TP can be a signal segment of a side-channel signal S generated by a computing unit during performing an encryption algorithm. As shown in FIG. 2, the side-channel signal S is a side-channel signal generated by a computing unit during performing the Advanced Encryption Standard algorithm, and the encrypted signal segment locating device 1 can extract a signal segment of the computing unit executing 9 loop operations from the side-channel signal S as the encrypted signal template TP, wherein the sampling frequency of the encrypted signal template TP is 1 GHZ, that is, the signal in each second of the encrypted signal template TP is represented by $10^9$ data points. In some embodiments, the side-channel signal S is a side-channel signal after feature extraction.

Furthermore, the encrypted signal segment locating device 1 can locate the encryption position corresponding to the specific encrypting operation in the side-channel input signal through comparing the positions in the encrypted signal template with the side-channel input signal having identical or similar waveform features and extract the encrypted signal segment corresponding to the specific encrypting operation from the side-channel input signal. After obtaining the encrypted signal segment, the encrypted signal segment locating device 1 can analyze the signal in the encrypted signal segment to interpret the key, the plaintext, or other information of the encrypting operation then. The operations of the encrypted signal segment locating device 1 locating the encryption position and extracting the encrypted signal segment from the side-channel input signal will be illustrated in the following paragraphs.

Figure 3:
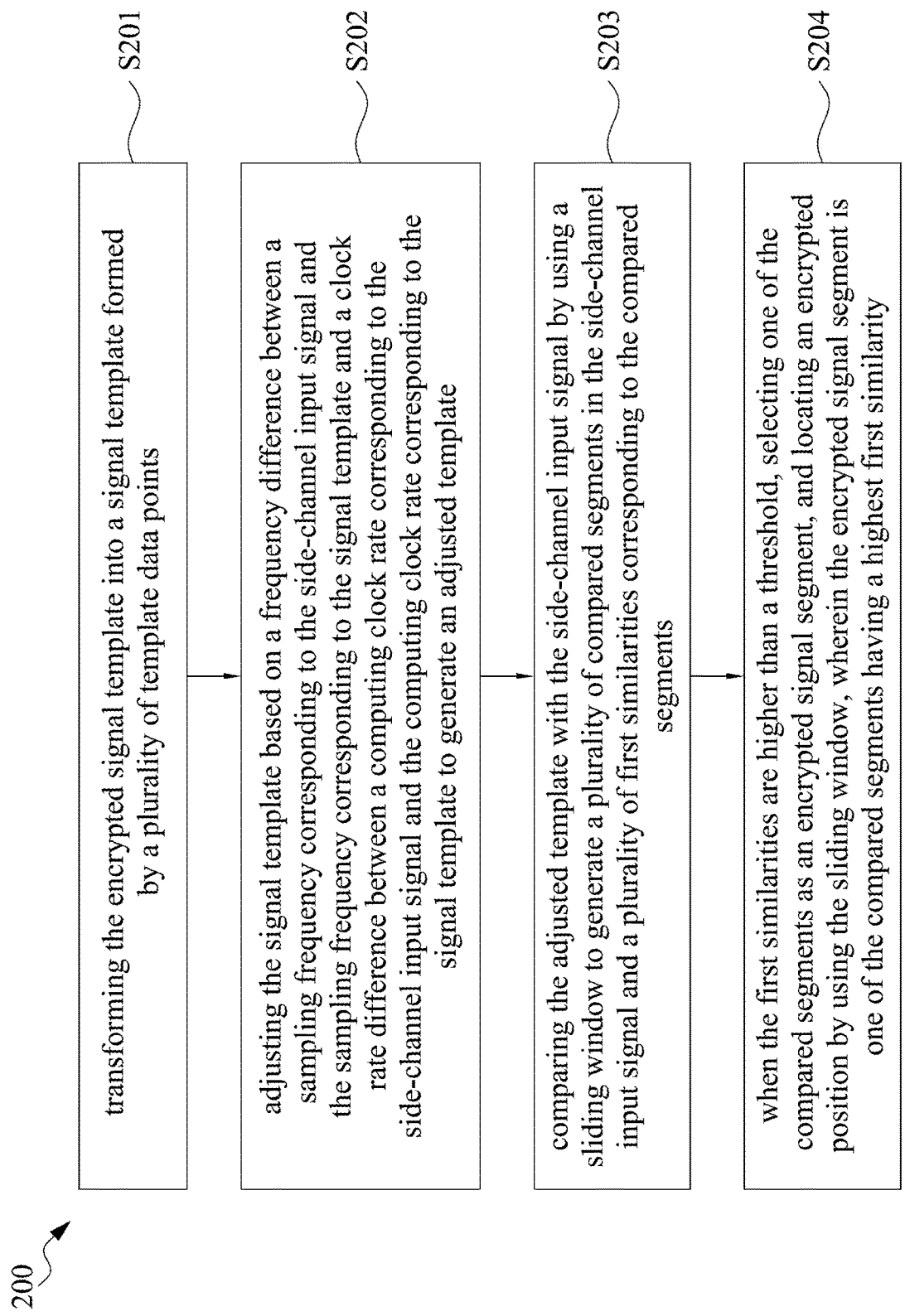
FIG. 3 is a flow diagram illustrating an encrypted signal segment locating method of the present disclosure.

The present disclosure also provides an encrypted signal segment locating method. Reference is made to FIG. 3. FIG. 3 is a flow diagram illustrating an encrypted signal segment locating method 200 according to some embodiments of the present disclosure. The encrypted signal segment locating method 200 includes steps S201-S204. The encrypted signal segment locating method 200 is configured to locate the encryption position corresponding to the specific encrypting operation in the side-channel signal and extract the encrypted signal segment. The encrypted signal segment locating method 200 can be executed by the encrypted signal segment locating method 1.

First, in the step S201, the processor 12 transforms the encrypted signal template into a signal template formed by a plurality of template data points. Specifically, the processor 12 first transforms the encrypted signal template in the form of a digital signal into an analog signal, and then estimates the template data points based on the analog signal to generate the signal template.

In some embodiments, the encrypted signal template can be a side-channel signal formed by a plurality of discrete data points, and the processor 12 can perform function approximation based on the digital signal to estimate a polynomial function of degree N approximating to the waveform of the digital signal, wherein N is an integer not less than 0. Next, the processor 12 then marks template data points on the polynomial function of degree N to generate the signal template.

In some embodiments, the processor 12 can add the estimated data points between the data points in the encrypted signal template by using interpolation method to reach the data point quantity for subsequent operations.

In some embodiments, the encrypted signal template can also be a side-channel analog signal in the form of a continuous waveform, and the processor 12 can mark the template data points on the continuous waveform directly to generate the signal template.

Next, in the step S202, the processor 12 adjusts the signal template based on a frequency difference between a sampling frequency corresponding to the side-channel input signal and the sampling frequency corresponding to the signal template and a clock rate difference between a computing clock rate corresponding to the side-channel input signal and the computing clock rate corresponding to the signal template to generate an adjusted template.

Specifically, when the sampling frequencies corresponding to the side-channel input signal and the signal template are different, the densities of the data points (i.e., the data point quantity in each second of the signal) in the side-channel input signal and the signal template are different. Also, when the computing clock rates corresponding to the side-channel input signal and the signal template are different, the time for computing units corresponding to the side-channel input signal and the signal template completing the same operation are also different (e.g., the computing unit with higher computing clock rate takes less time to complete the same encrypting operation). Therefore, the processor 12 needs to adjust the quantity and/or the density of data points in the signal template to make the adjusted signal template matches the quantity and/or the density of data points in the side-channel input signal.

In some embodiments, the processor 12 further calculates an adjusted count based on the frequency difference and the clock rate difference and executes a number corresponding to the adjusted count of a resampling operation to adjust the signal template in the operation of generating the adjusted template. Specifically, when the frequency difference and the clock rate difference between the side-channel input signal and the signal template are greater, the processor 12 can set the adjusted count as a higher value to increase the frequency of adjusting the side-channel input signal. Relatively, when the frequency difference and the clock rate difference between the side-channel input signal and the signal template are less, the processor 12 can set the adjusted count as a smaller value to decrease the frequency of adjusting the side-channel input signal.

In other words, the processor 12 can calculate the adjusted count based on the frequency difference and the clock rate difference, and then the processor 12 adjusts the signal template based on the adjusted count. Therefore, the encrypted signal segment locating device 1 does not need to compare the signal template with the side-channel input signal after adjusting the signal template repeatedly. Instead, the encrypted signal segment locating device 1 can refer the differences between the sampling frequencies and the computing clock rates of the side-channel input signal and the signal template and adjust the data points in the signal template to be close to the distribution of the side-channel input signal to improve the similarity of the comparison and reduce the number of comparisons and adjustments, thereby locating the encryption position and selecting the encrypted signal segment more precisely.

In some embodiments, in response to the frequency difference between the sampling frequency corresponding to the side-channel input signal and the sampling frequency corresponding to the signal template determined existed, the processor 12 increases the adjusted count; and in response to the clock rate difference between the computing clock rate corresponding to the side-channel input signal and the computing clock rate corresponding to the signal template determined existed, the processor 12 increases the adjusted count in the operation of calculating the adjusted count.

For example, the processor 12 set the adjusted count as 0. Accordingly, when there is no frequency difference between the side-channel input signal and the signal template, the processor 12 does not increase the adjusted count. Relatively, when the frequency difference between the side-channel input signal and the signal template exists, the processor 12 increases the adjusted count by 1. Furthermore, when there is no clock rate difference between the side-channel input signal and the signal template, the processor 12 does not increase the adjusted count. Relatively, when the clock rate difference between the side-channel input signal and the signal template exists, the processor 12 increases the adjusted count by 1.

Therefore, when there is no frequency difference and clock rate difference between the side-channel input signal and the signal template, the adjusted count can be set as 0 by the processor 12, namely, the adjusted count will not be adjusted. When one of the frequency difference and the clock rate difference exists between the side-channel input signal and the signal template, the adjusted count can be set as 1 by the processor 12, namely, the adjusted count will be adjusted once based on the frequency difference or the clock rate difference. When the frequency difference and the clock rate difference exist between the side-channel input signal and the signal template, the adjusted count can be set as 2 by the processor 12, namely, the adjusted count will be adjusted twice based on the frequency difference and the clock rate difference respectively.

Next, the processor 12 can resample the signal template to adjust the signal template. In some embodiments, the adjusted template comprises a plurality of first adjusted data points in the template data points. For example, if the signal template needs to be adjusted to an adjusted template with lower sampling frequency, the processor 12 can downsample the signal template in order to eliminate some of the data points in the signal template and reduce the density of the data points to generate the adjusted template. Relatively, if the signal template needs to be adjusted to an adjusted template with higher sampling frequency, the processor 12 can upsample the signal template in order to increase the density of data points in the encrypted signal template TP to generate the adjusted template.

In the aspect of the frequency difference, the processor 12 can adjust the signal template based on the frequency difference to make the sampling frequency corresponding to the signal template the same as the sampling frequency corresponding to the side-channel input signal. Specifically, the processor 12 can first transform the encrypted signal template TP shown in FIG. 2 into the signal template and then adjust the signal template to adjusted templates corresponding to difference sampling frequencies through increasing or reducing the density of data points in the signal template.

For example, when the sampling frequency is reduced to ½ times, the processor 12 can downsample the data points in the signal template (e.g., reduce the data point quantity to ½ times), namely, eliminating some of the data points in the signal template to generate the adjusted template. Accordingly, the processor 12 can generate an adjusted template with identical sampling frequency based on the sampling frequency of the side-channel input signal.

In some embodiments, the processor 12 adjusts the signal template based on a frequency ratio of the sampling frequency corresponding to the side-channel input signal and the sampling frequency corresponding to the signal template, wherein the frequency ratio and a ratio between a data point quantity of the adjusted template and the data point quantity of the signal template are positively related.

Figure 4A:
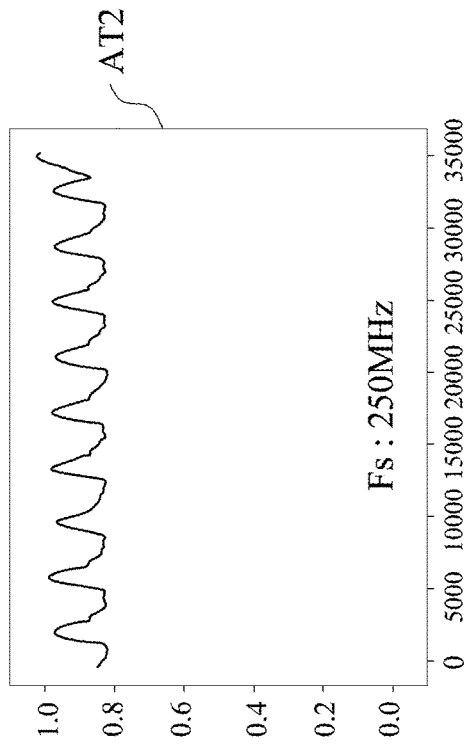
FIG. 4A-4C is a schematic diagram illustrating adjusted templates corresponding to different sampling frequencies of the present disclosure.
Figure 4B:
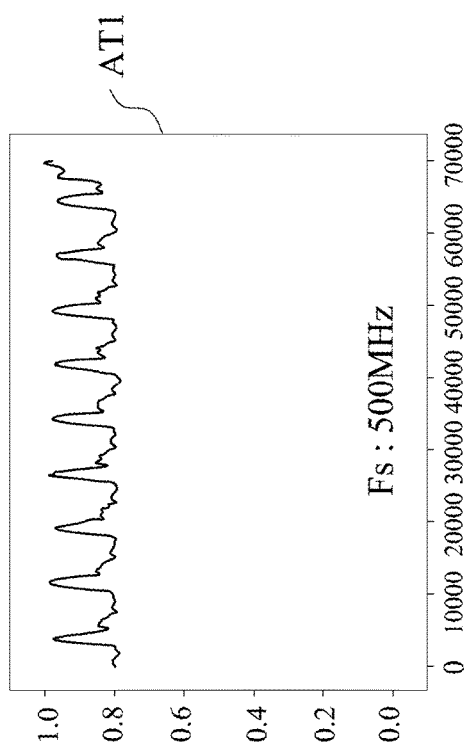
Figure 4C:
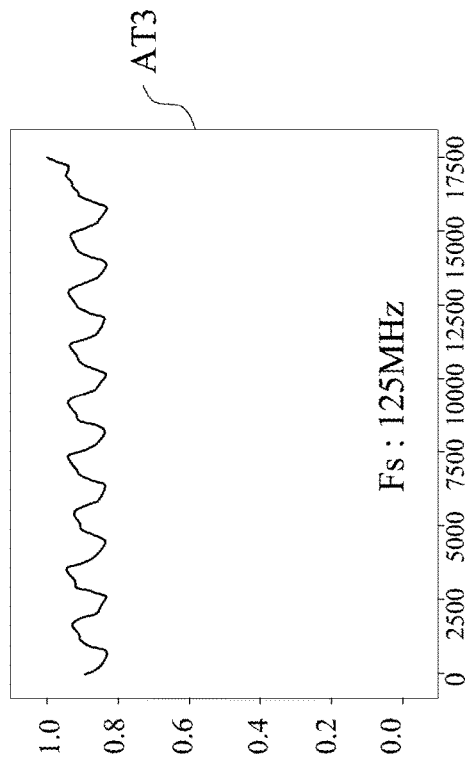

Specifically, reference is made to FIG. 4A-4C, FIG. 4A illustrates an adjusted template AT1 being obtained through transforming and adjusting based on the encrypted signal template TP with a 1 GHz sampling frequency, wherein the adjusted template AT1 corresponds to a 500 MHz sampling frequency Fs; FIG. 4B illustrates an adjusted template AT2 being obtained through transforming and adjusting based on the encrypted signal template TP, wherein the adjusted template AT2 corresponds to a 250 MHz sampling frequency Fs; FIG. 4C illustrates an adjusted template AT3 being obtained through transforming and adjusting based on the encrypted signal template TP, wherein the adjusted template AT3 corresponds to a 125 MHz sampling frequency Fs.

It is noted that, the adjusted templates AT1, AT2, and AT3 generated through adjusting the encrypted signal template TP have similar waveform with the encrypted signal template TP. However, as shown in FIGS. 2 and 4A-4C, the data point quantities of the encrypted signal template TP and the adjusted templates AT1, AT2, and AT3 are different, wherein the sampling frequency of the adjusted template AT1 is ½ times of the sampling frequency of the encrypted signal template TP, the data point quantity of the adjusted template AT1 is also ½ times of the data point quantity of the encrypted signal template TP; the sampling frequency of the adjusted template AT2 is ¼ times of the sampling frequency of the encrypted signal template TP, the data point quantity of the adjusted template AT2 is also ¼ times of the data point quantity of the encrypted signal template TP; and the sampling frequency of the adjusted template AT3 is ⅛ times of the sampling frequency of the encrypted signal template TP, the data point quantity of the adjusted template AT3 is also ⅛ times of the data point quantity of the encrypted signal template TP. In view of this, in this embodiment, the data point quantity ratios between the encrypted signal template TP and the adjusted templates AT1, AT2, and AT3 respectively are the same as the corresponding sampling frequency ratios. Accordingly, the processor 12 can generate adjusted templates with identical sampling frequencies based on sampling frequencies of the side-channel input signals.

In the aspect of the clock rate difference, the processor 12 can adjust the signal template based on the frequency difference to make the computing clock rate corresponding to the signal template the same as the computing clock rate corresponding to the side-channel input signal. If the computing clock rate corresponding to the signal template is different from the computing clock rate corresponding to the side-channel input signal, the processor 12 can also resample the signal template to adjust it. If the computing clock rate corresponding to the signal template is lower than the computing clock rate corresponding to the side-channel input signal, it means that it takes longer time to complete the same operation, thereby more data points generated through the signal measurement. Therefore, the processor 12 can upsample the signal template and add estimated data points to the signal template to generate the adjusted template. Relatively, if the computing clock rate corresponding to the signal template is higher than the computing clock rate corresponding to the side-channel input signal, it means that it takes shorter time to complete the same operation, thereby less data points generated through the signal measurement. Therefore, the processor 12 can downsample the signal template and eliminate some of the data points in the signal template to generate the adjusted template.

For example, when the clock rate rises to 2 times, the processor 12 can downsample the data points in the signal template (e.g., reducing the data point quantity by ½, ⅓, or ¼ times) and eliminate some of the data points in the signal template to generate the adjusted template. Accordingly, the processor 12 can generate adjusted templates with identical computing clock rates based on computing clock rates of the side-channel input signals.

In some embodiments, the processor 12 adjusts the signal template based on a clock rate ratio of the computing clock rate corresponding to the side-channel input signal and the computing clock rate corresponding to the signal template, wherein the clock rate ratio and a ratio between a data point quantity of the adjusted template and the data point quantity of the signal template are negatively related.

Figures 5A, 5B:
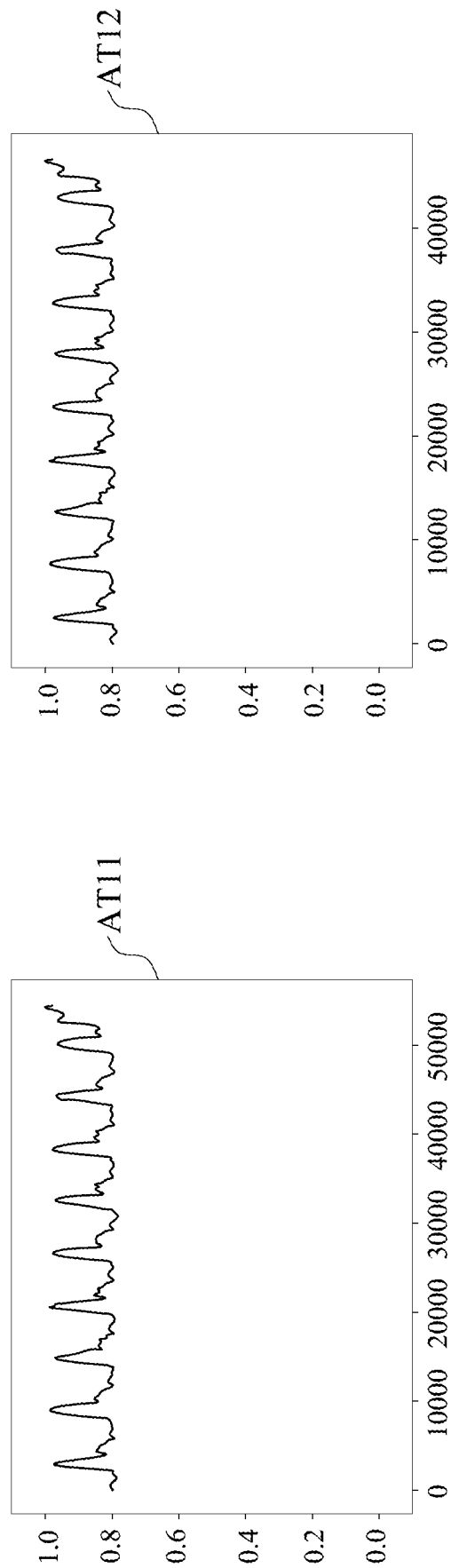
FIG. 5A-5B is a schematic diagram illustrating adjusted templates corresponding to different computing clock rates of the present disclosure.

Take the adjusted template AT1 shown in FIG. 4A as an example, assumed that the computing clock rate of the adjusted template AT1 is 16 MHZ, the processor 12 adjusts the adjusted template AT1 to generate the adjusted templates AT11 and AT12 corresponding to other computing clock rates, and the adjusted templates AT11 and AT12 are shown in FIGS. 5A and 5B, wherein the adjusted template AT11 corresponding to 48 MHz computing clock rate, and the adjusted template AT12 corresponding to 72 MHz computing clock rate.

The computing clock rate Clock corresponding to the adjusted template AT11 (i.e., 48 MHZ) is 3 times the computing clock rate corresponding to the adjusted template AT1 (i.e., 16 MHZ). Comparing FIG. 4A with 5A, the data point quantity of the adjusted template AT11 (i.e., about 56000) is roughly 0.8 times the data point quantity of the adjusted template AT1 (i.e., about 70000). The computing clock rate Clock corresponding to the adjusted template AT12 (i.e., 72 MHZ) is 4.5 times the computing clock rate corresponding to the adjusted template AT1 (i.e., 16 MHZ). Comparing FIG. 4A with 5B, the data point quantity of the adjusted template AT12 (i.e., about 43750) is roughly 0.625 times the data point quantity of the adjusted template AT1 (i.e., about 70000).

It is noticed that, the adjusted templates AT11 and AT12 generated through adjusting the adjusted template AT1 have similar waveform with the adjusted template AT1. However, as shown in the horizontal axes in FIGS. 4A, 5A, and 5B, the data point quantities of the adjusted templates AT1, AT11, and AT12 are not identical.

Also, when the computing clock rate corresponding to the adjusted template is higher than the computing clock rate corresponding to the signal template, the data point quantity of the adjusted template is less than the data point quantity of the signal template. The larger the clock rate ratio between the computing clock rates, the larger the amount of reduction of the data point quantity. Relatively, when the computing clock rate corresponding to the adjusted template is lower than the computing clock rate corresponding to the signal template, the data point quantity of the adjusted template is more than the data point quantity of the signal template. The larger the clock rate ratio between the computing clock rates, the larger the amount of increase of the data point quantity.

Next, in the step S203, the processor 12 compares the adjusted template with the side-channel input signal by using a sliding window to generate a plurality of compared segments in the side-channel input signal and a plurality of first similarities corresponding to the compared segments.

Figure 6:
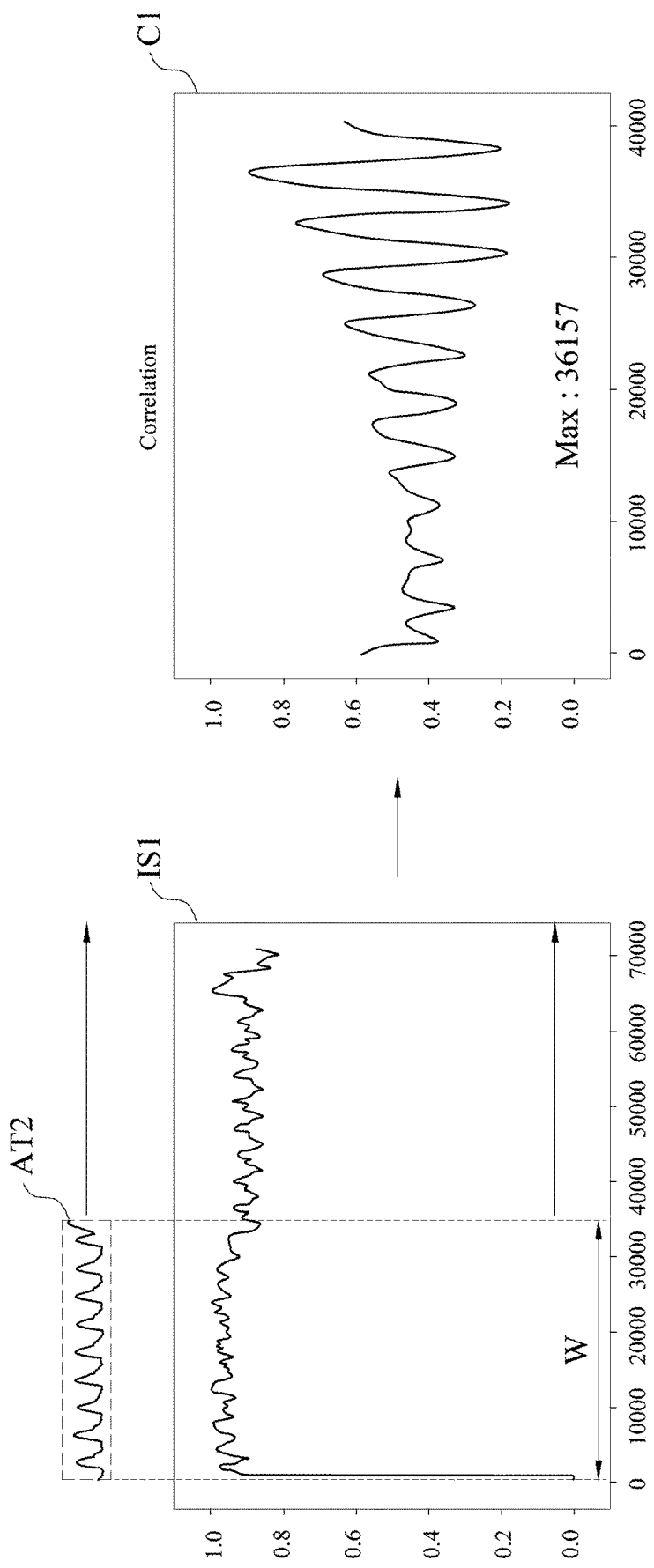
FIG. 6 is a schematic diagram illustrating comparing an adjusted template with a side-channel input signal by using a sliding window to generate similarities of the present disclosure.

Reference is made to FIG. 6. FIG. 6 is a schematic diagram illustrating comparing an adjusted template AT2 with a side-channel input signal IS1 by using a sliding window W to generate similarities C1 of the present disclosure. After the processor 12 generates the corresponding adjusted template AT2 based on the sampling frequency and the computing clock rate of the side-channel input signal IS1, as shown in FIG. 6, the processor 12 aligns the sliding window W to the origin of the side-channel input signal IS1 (i.e., the position of 0 on horizontal axis of the side-channel input signal IS1), wherein the lengths of the sliding window W and the adjusted template AT2 are identical. Furthermore, the processor 12 compares data points of the side-channel input signal IS1 in the sliding window W with adjusted data points of the adjusted template AT2 to calculate the similarities C1. After the similarities C1 of one position is calculated, the sliding window W slides one data point to the right to compare the signal segment in the next position of the sliding window W, wherein the similarities C1 represent the level of similarities between the adjusted template AT2 corresponding to signal segments of each position of the side-channel input signal IS1. The higher the similarities C1, the higher the level of similarities between the waveforms of the corresponding signal segment of the side-channel input signal IS1 and the adjusted template AT2. Relatively, the lower the similarities C1, the lower the level of similarities between the waveforms of the corresponding signal segment of the side-channel input signal IS1 and the adjusted template AT2.

In some embodiments, the processor 12 calculates a correlation coefficient between the first adjusted data points of the adjusted template and a plurality of input signal value of each of the compared segments; and the processor 12 takes the correlation coefficient corresponding to each of the compared segments as one of the first similarities. Namely, the processor 12 calculates correlation coefficients between data points of the side-channel input signal IS1 in the sliding window W and adjusted data points of the adjusted template AT2 and takes the correlation coefficients as the similarities C1.

Finally, in the step S204, when the first similarities are higher than a threshold, the processor 12 selects one of the compared segments as an encrypted signal segment, and the processor 12 locates an encryption position by using the sliding window, wherein the encrypted signal segment is one of the compared segments having a highest first similarity.

For example, the processor 12 compares whether the maximum value of the similarities C1 (i.e., the similarity of coordinate 36517 in horizontal axis) is higher than the threshold (e.g., 0.7). If the maximum value is higher than the threshold, the encryption position is coordinate 36517 in horizontal axis, and the encrypted signal segment is the signal segment framed by the sliding window W in the side-channel input signal IS1 when the sliding window W is positioned on coordinate 36517, wherein the encrypted signal segment is the most similar segment in the side-channel input signal IS1 with the waveform of the adjusted template AT2. Through filtering by the threshold, the processor 12 can ensure that there is a certain level of similarity between the encrypted signal segment and the adjusted template AT2.

In some embodiments, in response to the first similarities lower than the threshold, the processor 12 further adjusts the adjusted template to generate a second adjusted template, wherein the adjusted template comprises a plurality of second adjusted data points, the second adjusted template comprises a plurality of third adjusted data points, and a quantity of the second adjusted data points is different from the quantity of the third adjusted data points; the processor 12 compares the second adjusted template with the side-channel input signal to generate the compared segments in the side-channel input signal and a plurality of second similarities corresponding to the compared segments; and when the second similarities are higher than the threshold, the processor 12 selects one of the compared segments as the encrypted signal segment, and the processor 12 locates the encryption position by using the sliding window, wherein the encrypted signal segment is one of the compared segments having a highest second similarity.

Figure 7:
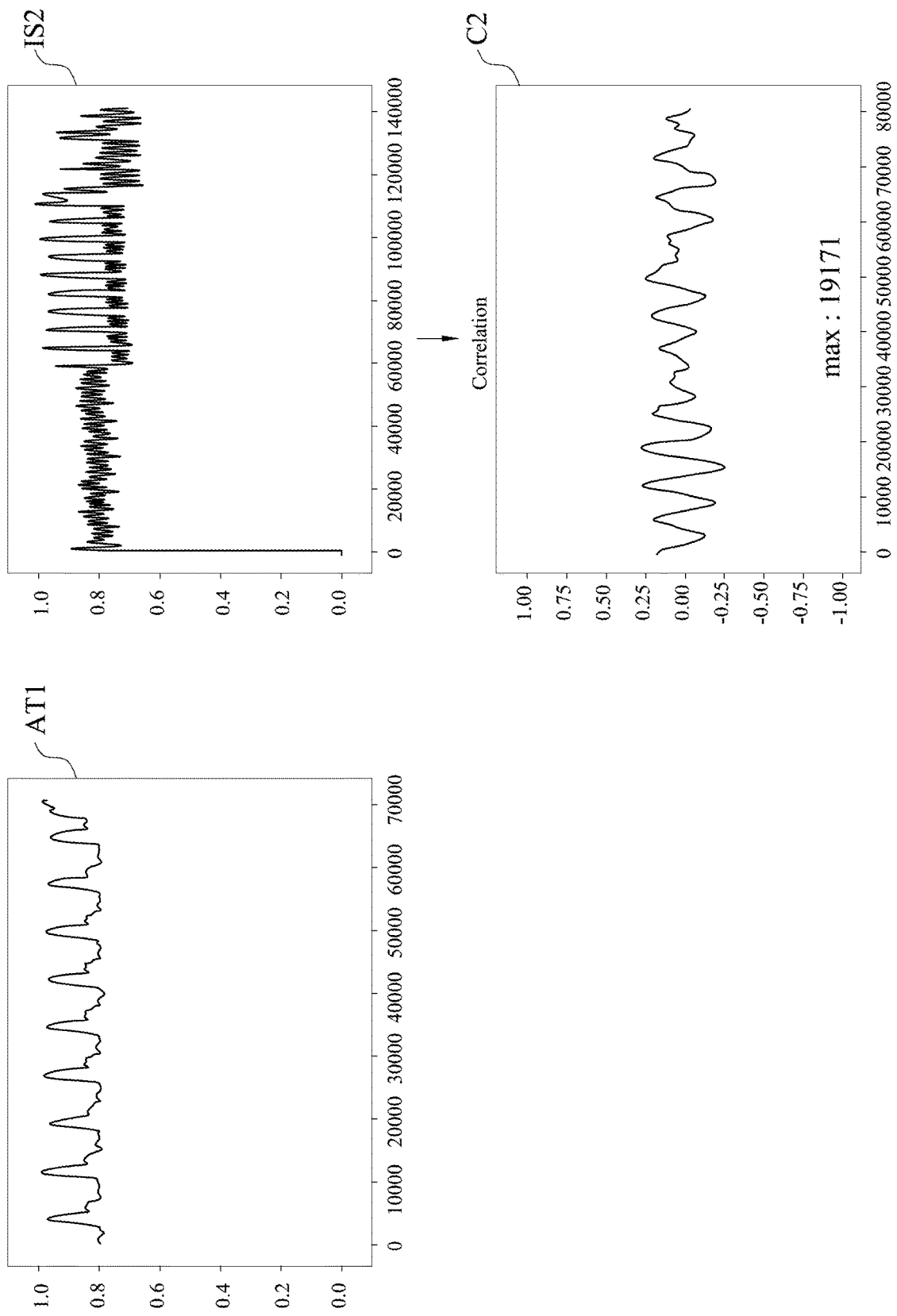
FIG. 7-8 is a schematic diagram illustrating comparing different adjusted templates with a side-channel input signal to generate similarities of the present disclosure.

For example, reference is made to FIG. 7, the processor 12 compares the adjusted template AT1 with the side-channel input signal IS2 and generates similarities C2 through the same operation illustrated in the embodiments mentioned above, wherein the maximum value of the similarities C2 is not higher than the threshold (e.g., 0.7), namely, the processor 12 did not match a sufficiently similar signal segment.

Therefore, the processor 12 adjusts the adjusted template AT1 again and executes the comparing operation with the side-channel input signal IS2 and the determination operation with the similarities based on the adjusted template AT1 after readjustment. In some embodiments, the processor 12 can resample the adjusted template AT1 again to eliminate or add data points, thereby generating the second adjusted template.

However, different form the resampling operation mentioned above, since the resampling operation mentioned here is not adjusting based on the frequency difference or clock rate difference as the above-mentioned embodiments, the processor 12 can increase or reduce data points in the template by a specific amount first, and the processor 12 determines whether increasing or reducing the data points and the amount of adjustment based on how the similarities change after comparing the template with the input signal and generating the similarities.

For example, the processor 12 can first downsample the adjusted template AT1 and generate an adjusted template AT13 after reducing 10000 data points, and then the processor 12 compares the adjusted template AT13 with the side-channel input signal IS2 to generate similarities. If the similarities were increased compared with the previous comparison, it means the downsampling operation makes the adjusted template AT13 more similar to the waveform of the side-channel input signal IS2. Accordingly, the processor 12 can downsample the adjusted template AT13 again and reduce the amount of the adjustment (e.g., reducing 5000 data points instead). Relatively, if the similarities were reduced compared with the previous comparison, it means the downsampling operation makes the adjusted template AT13 less similar to the waveform of the side-channel input signal IS2. Accordingly, the processor 12 can upsample the adjusted template AT13 instead (e.g., increasing 10000 data points).

Figure 8:
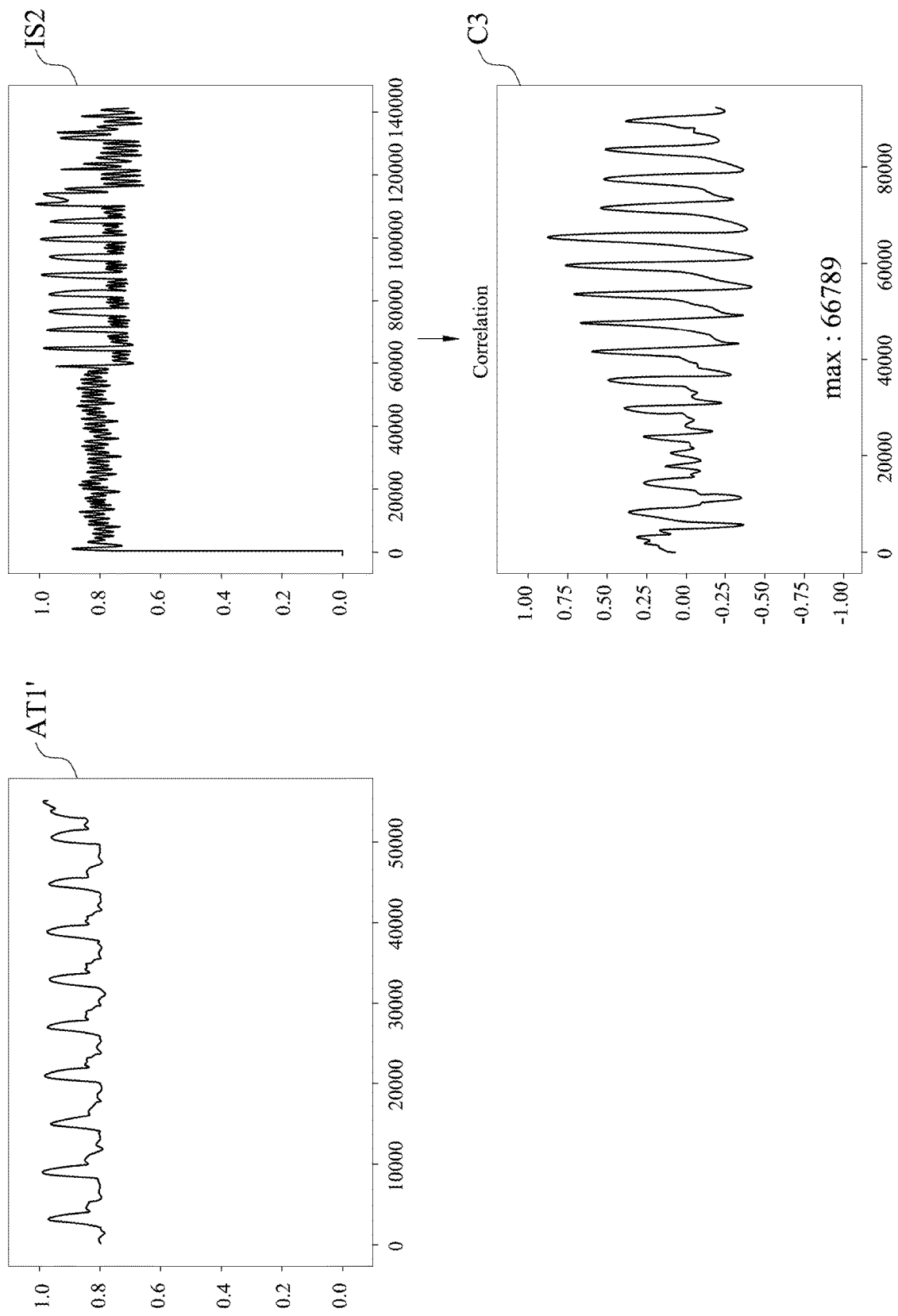

In view of this, the processor 12 can generate an adjusted template AT1' more similar with the side-channel input signal IS2 based on the adjusted template AT1 as shown in FIG. 8. Furthermore, the processor 12 can obtain similarities C3 after comparing the adjusted template AT1' with the side-channel input signal IS2. If the similarities C3 is higher than the threshold, the processor 12 can locate the encrypted position and extract the encrypted signal segment through the operations mentioned above.

Figure 9:
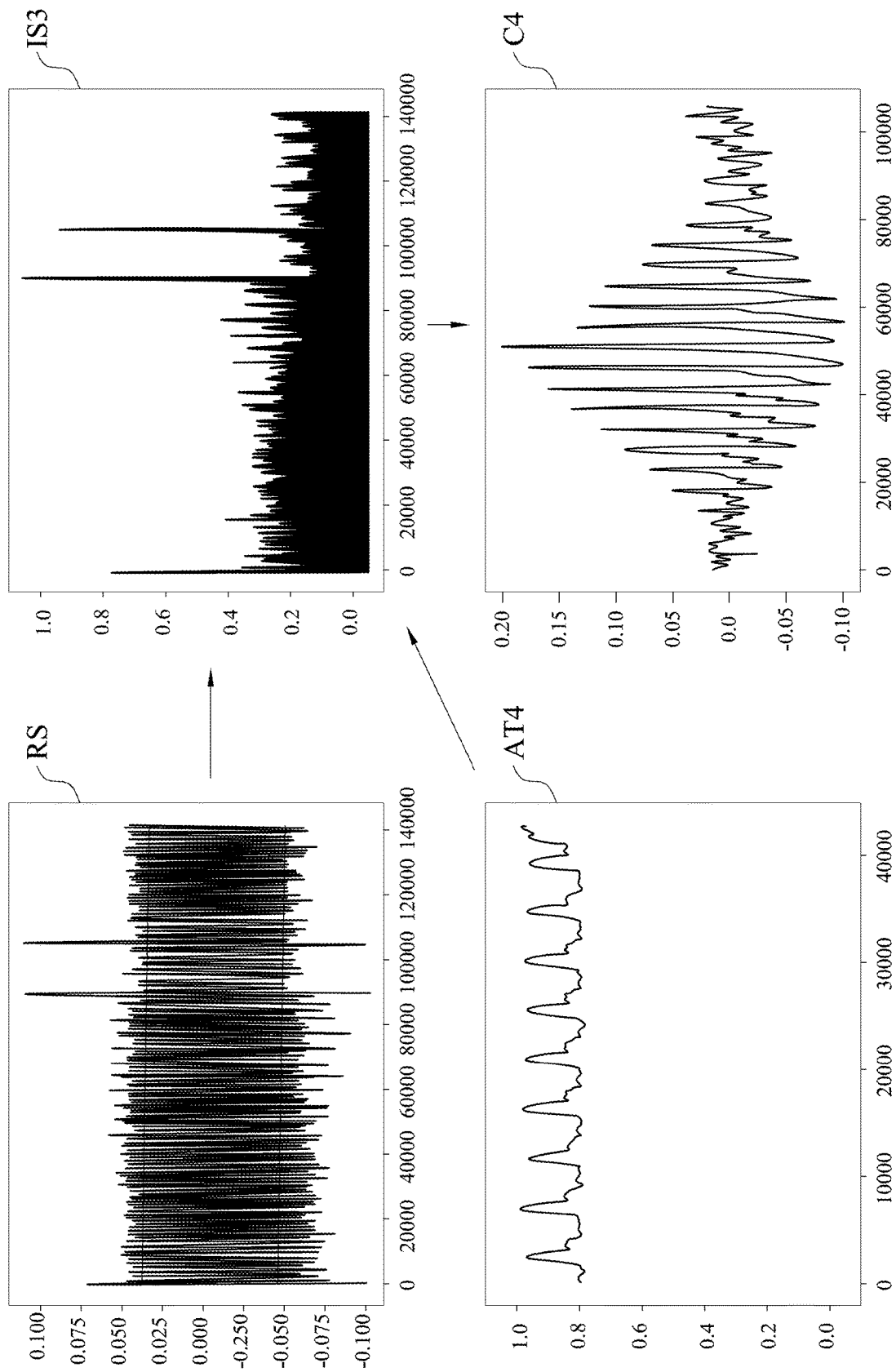
FIG. 9 is a schematic diagram illustrating performing a locating operation based on a raw side-channel signal of the present disclosure.

In some embodiments, the encrypted signal segment locating device 1 can also take side-channel signals without feature extracted as the side-channel input signal for locating. Reference is made to FIG. 9. FIG. 9 is a schematic diagram illustrating performing a locating operation based on a raw side-channel signal RS of the present disclosure.

As shown in FIG. 9, the raw side-channel signal RS is a raw signal measured by the side-channel sensor 16, and the processor 12 can transform the raw side-channel signal RS into a side-channel input signal IS3 through filtering and taking absolute values operations. Furthermore, the processor 12 compares an adjusted template AT4 with the side-channel input signal IS3 to generate similarities C4 through the same operations mentioned above. As shown from the similarities C4 in FIG. 9, although the similarities is relatively lower due to the unfeatured-extracted side-channel input signal IS3 (the maximum value is about 0.20), it can be seen that the distribution of the similarities C4 is similar with the periodic distributions of the similarities C1 in FIG. 6 and the similarities C3 in FIG. 8. Accordingly, the processor 12 can still locate the corresponding encrypted position and extract the encrypted signal segment based on the maximum value of the similarities C4.

In summary, the encrypted signal segment locating device 1 in the present disclosure can compare the side-channel input signal with the signal template and locate the encrypted position corresponding to a specific encrypting operation and extract the encrypted signal segment from the side-channel input signal. Accordingly, the encrypted signal segment extracted by the encrypted signal segment locating device 1 can be further analyzed to interpret the key, plaintext, or other information of the encrypting operation. The encrypted signal segment locating device 1 adjusts data points in the signal template based on differences between sampling frequencies and computing clock rates of the signal template and the side-channel input signal to make the quantity and the density of the data points in the signal template similar to the data points in the side-channel input signal before comparison. Also, the encrypted signal segment locating device 1 can further make the signal template more similar with the side-channel input signal through multiple adjustment and comparison to ensure the precision of the comparison result, thereby increasing the precision of the encrypted position located and the encrypted signal segment extracted.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. An encrypted signal segment locating device, comprising:
   a side-channel sensor, configured to detect a side-channel input signal;
   a storage, configured to store an encrypted signal template and the side-channel input signal; and
   a processor, electrically connected to the side-channel sensor and the storage, the processor is configured to execute the following operations:
   transforming the encrypted signal template into a signal template formed by a plurality of template data points;
   adjusting the signal template based on a frequency difference between a sampling frequency corresponding to the side-channel input signal and the sampling frequency corresponding to the signal template and a clock rate difference between a computing clock rate corresponding to the side-channel input signal and the computing clock rate corresponding to the signal template to generate an adjusted template;
   comparing the adjusted template with the side-channel input signal by using a sliding window to generate a plurality of compared segments in the side-channel input signal and a plurality of first similarities corresponding to the compared segments; and
   when the first similarities are higher than a threshold, selecting one of the compared segments as an encrypted signal segment, and locating an encryption position by using the sliding window, wherein the encrypted signal segment is one of the compared segments having a highest first similarity.

2. The encrypted signal segment locating device of claim 1, wherein the operation of generating the adjusted template further comprising:

calculating an adjusted count based on the frequency difference and the clock rate difference; and executing a number corresponding to the adjusted count of a resampling operation to adjust the signal template.

3. The encrypted signal segment locating device of claim 2, wherein the operation of calculating the adjusted count further comprising:

in response to the frequency difference between the sampling frequency corresponding to the side-channel input signal and the sampling frequency corresponding to the signal template determined existed, increasing the adjusted count; and in response to the clock rate difference between the computing clock rate corresponding to the side-channel input signal and the computing clock rate corresponding to the signal template determined existed, increasing the adjusted count.

4. The encrypted signal segment locating device of claim 2, wherein the resampling operation further comprising:

adjusting the signal template based on the frequency difference to make the sampling frequency corresponding to the side-channel input signal the same as the sampling frequency corresponding to the signal template.

5. The encrypted signal segment locating device of claim 2, wherein the resampling operation further comprising:

adjusting the signal template based on a frequency ratio of the sampling frequency corresponding to the side-channel input signal and the sampling frequency corresponding to the signal template, wherein the frequency ratio and a ratio between a data point quantity of the adjusted template and the data point quantity of the signal template are positively related.

6. The encrypted signal segment locating device of claim 2, wherein the resampling operation further comprising:

adjusting the signal template based on the clock rate difference to make the computing clock rate corresponding to the side-channel input signal the same as the computing clock rate corresponding to the signal template.

7. The encrypted signal segment locating device of claim 2, wherein the resampling operation further comprising:

adjusting the signal template based on a clock rate ratio of the computing clock rate corresponding to the side-channel input signal and the computing clock rate corresponding to the signal template, wherein the clock rate ratio and a ratio between a data point quantity of the adjusted template and the data point quantity of the signal template are negatively related.

8. The encrypted signal segment locating device of claim 1, wherein the adjusted template comprises a plurality of first adjusted data points in the template data points.

9. The encrypted signal segment locating device of claim 8, wherein the operation of comparing the adjusted template with the side-channel input signal by using a sliding window further comprising:

calculating a correlation coefficient between the first adjusted data points of the adjusted template and a plurality of input signal value of each of the compared segments; and taking the correlation coefficient corresponding to each of the compared segments as one of the first similarities.

10. The encrypted signal segment locating device of claim 1, wherein the processor is further configured to execute the following operations:

in response to the first similarities lower than the threshold, adjusting the adjusted template to generate a second adjusted template, wherein the adjusted template comprises a plurality of second adjusted data points, the second adjusted template comprises a plurality of third adjusted data points, and a quantity of the second adjusted data points is different from the quantity of the third adjusted data points;

comparing the second adjusted template with the side-channel input signal to generate the compared segments in the side-channel input signal and a plurality of second similarities corresponding to the compared segments; and when the second similarities are higher than the threshold, selecting one of the compared segments as the encrypted signal segment, and locating the encryption position by using the sliding window, wherein the encrypted signal segment is one of the compared segments having a highest second similarity.

11. An encrypted signal segment locating method, being adapted for use in an electronic device, wherein the electronic device comprises a side-channel sensor, a storage, and a processor, the side-channel sensor is configured to detect a side-channel input signal, the storage is configured to store an encrypted signal template and the side-channel input signal, the processor is electrically connected to the side-channel sensor and the storage and configured to execute the encrypted signal segment locating method, and the encrypted signal segment locating method comprises the following steps:

transforming the encrypted signal template into a signal template formed by a plurality of template data points;

adjusting the signal template based on a frequency difference between a sampling frequency corresponding to the side-channel input signal and the sampling frequency corresponding to the signal template and a clock rate difference between a computing clock rate corresponding to the side-channel input signal and the computing clock rate corresponding to the signal template to generate an adjusted template;

comparing the adjusted template with the side-channel input signal by using a sliding window to generate a plurality of compared segments in the side-channel input signal and a plurality of first similarities corresponding to the compared segments; and when the first similarities are higher than a threshold, selecting one of the compared segments as an encrypted signal segment, and locating an encryption position by using the sliding window, wherein the encrypted signal segment is one of the compared segments having a highest first similarity.

12. The encrypted signal segment locating method of claim 11, wherein the step of generating the adjusted template further comprising:

calculating an adjusted count based on the frequency difference and the clock rate difference; and executing a number corresponding to the adjusted count of a resampling step to adjust the signal template.

13. The encrypted signal segment locating method of claim 12, wherein the step of calculating the adjusted count further comprising:

in response to the frequency difference between the sampling frequency corresponding to the side-channel input signal and the sampling frequency corresponding to the signal template determined existed, increasing the adjusted count; and in response to the clock rate difference between the computing clock rate corresponding to the side-channel input signal and the computing clock rate corresponding to the signal template determined existed, increasing the adjusted count.

14. The encrypted signal segment locating method of claim 12, wherein the resampling step further comprising:
adjusting the signal template based on the frequency difference to make the sampling frequency corresponding to the side-channel input signal the same as the sampling frequency corresponding to the signal template.

15. The encrypted signal segment locating method of claim 12, wherein the resampling step further comprising:
adjusting the signal template based on a frequency ratio of the sampling frequency corresponding to the side-channel input signal and the sampling frequency corresponding to the signal template, wherein the frequency ratio and a ratio between a data point quantity of the adjusted template and the data point quantity of the signal template are positively related.

16. The encrypted signal segment locating method of claim 12, wherein the resampling step further comprising:
adjusting the signal template based on the clock rate difference to make the computing clock rate corresponding to the side-channel input signal the same as the computing clock rate corresponding to the signal template.

17. The encrypted signal segment locating method of claim 12, wherein the resampling step further comprising:
adjusting the signal template based on a clock rate ratio of the computing clock rate corresponding to the side-channel input signal and the computing clock rate corresponding to the signal template, wherein the clock rate ratio and a ratio between a data point quantity of the adjusted template and the data point quantity of the signal template are negatively related.

18. The encrypted signal segment locating method of claim 11, wherein the adjusted template comprises a plurality of first adjusted data points in the template data points.

19. The encrypted signal segment locating method of claim 18, wherein the step of comparing the adjusted template with the side-channel input signal by using a sliding window further comprising:
calculating a correlation coefficient between the first adjusted data points of the adjusted template and a plurality of input signal value of each of the compared segments; and
taking the correlation coefficient corresponding to each of the compared segments as one of the first similarities.

20. The encrypted signal segment locating method of claim 11, wherein the processor is further configured to execute the following steps:
in response to the first similarities lower than the threshold, adjusting the adjusted template to generate a second adjusted template, wherein the adjusted template comprises a plurality of second adjusted data points, the second adjusted template comprises a plurality of third adjusted data points, and a quantity of the second adjusted data points is different from the quantity of the third adjusted data points;
comparing the second adjusted template with the side-channel input signal to generate the compared segments in the side-channel input signal and a plurality of second similarities corresponding to the compared segments; and
when the second similarities are higher than a threshold, selecting one of the compared segments as the encrypted signal segment, and locating the encryption position by using the sliding window, wherein the encrypted signal segment is one of the compared segments having a highest second similarity.

* * * * *